United States Patent [19]

Kunkle et al.

[11] Patent Number: 5,190,615
[45] Date of Patent: Mar. 2, 1993

[54] LOW BRIGHTNESS FUNCTIONAL PIGMENT FROM PROCESS BY-PRODUCT

[75] Inventors: Albert C. Kunkle; Robert E. Hardy, both of Macon; Bobby Ray Skipper, Cochran, all of Ga.

[73] Assignee: J. M. Huber Corporation, Rumson, N.J.

[21] Appl. No.: 875,894

[22] Filed: Apr. 27, 1992

Related U.S. Application Data

[62] Division of Ser. No. 07/643,885, Jun. 18, 1991.

[51] Int. Cl.$^5$ ............................................. D21H 17/68
[52] U.S. Cl. .................................. 162/135; 162/181.4; 162/181.5; 428/454; 428/537.5; 106/416; 106/486
[58] Field of Search .................. 162/181.4, 181.5, 135; 428/454, 537.5

[56] References Cited

U.S. PATENT DOCUMENTS

| | | | |
|---|---|---|---|
| 4,014,705 | 3/1977 | Dykstra et al. | 106/300 |
| 4,971,629 | 11/1990 | Dunaway et al. | 106/468 |
| 5,047,375 | 9/1991 | Dunaway et al. | 106/439 |

Primary Examiner—William R. Dixon, Jr.
Assistant Examiner—Margaret V. Einsmann
Attorney, Agent, or Firm—Alec H. Horn; Harold H. Flanders; Robert L. Price

[57] ABSTRACT

A low brightness pigment and method is provided from a heretofore rejected waste kaolin stream. Kaolin processing rejects are high in iron-stained $TiO_2$. After separating the stained $TiO_2$ from the high brightness kaolin and concentrating the resulting fraction, the material can be processed to produce a low brightness pigment suitable of many applications where lower brightness is desirable, such as coating paper board without mottling.

3 Claims, No Drawings

LOW BRIGHTNESS FUNCTIONAL PIGMENT FROM PROCESS BY-PRODUCT

This application is a division of application Ser. No. 07/643,885, filed Jan. 18, 1991.

TECHNICAL FIELD

The present invention relates to mineral pigments for use in the paper industry and more particularly relates to a method of producing low brightness pigments from beneficiation process by-products.

BACKGROUND ART

Natural occurring clays vary considerably in their color properties, even when produced from mines in the same locality or even from different sites in the same mine. Natural occurring kaolin clay deposits contain discoloring contaminants, for example, iron and titanium minerals. Titanium minerals in kaolin usually occur as discolored particles and these, coupled with iron oxides and other ferriferous material, are largely responsible for the yellow-brown shade of many kaolins. Often a clay is rejected as being unsuitable for commercial use solely on the basis of brightness even though its other physical properties, such as the viscosity of clay-water slurries and particle size, are within desired limits.

Much attention and research in the clay industry has focused on developing processes to increase the brightness of clays. In the water wash process, crude clay is slurried, degritted, fractionated to the desired particle size and the resulting fractions leached with zinc or sodium dithionite at a pH of 3.5-4.0 to improve both brightness and shade. Brightness improvements due to dithionite leaching can be quite substantial; however, the increase in brightness is generally insufficient to make high brightness products in the range of 90 TAPPI brightness, or to make lower brightness products when highly discolored crude clays are employed. Therefore, other processing methods, such as selective sedimentation, magnetic separation, froth flotation, and selective flocculation, have been developed for use in conjunction with dithionite to improve the brightness of the leached products. These methods can be employed to produce both standard and high brightness products from highly discolored starting materials by removing much of the iron stained titanium and ferriferrous material prior to the leaching step. Selective sedimentation, magnetic separation, froth flotation and selective flocculation are processes designed to remove the highly discolored titanium impurities and iron oxides. The dithionite leach step solublizes and removes a portion of the amorphous ferriferrous impurities on the clay surface.

The most successful processes developed to date to improve the brightness of clays are those in which impurities, such as titanium and iron compounds, are removed by selective sedimentation, selective flocculation, more commonly referred to as Differential Flocculation of Anatase (DFA), and magnetic separation.

The selective sedimentation process is exemplified by U.S. Pat. No. 3,371,988 to Maynard et al. The process of this patent has been found to be disadvantageous in that relatively long sedimentation periods are required.

U.S. Pat. No. 3,857,781 to Maynard exemplifies the DFA process which is a substantial improvement over U.S. Pat. No. 3,371,988. This process involves the use of an anionic, high molecular weight polymer in the presence of specific inorganic salts which flocculates and settles out much of the iron-stained titanium dioxide contaminates at extremely rapid sedimentation rates.

A third process exemplified by U.S. Pat. No. 4,424,124 to Iannicelli involves the removal of iron oxides and iron stained $TiO_2$ impurities by magnetic separation. All three processes, selective sedimentation, DFA, and magnetic separation produce a substantial amount of reject material which have heretofore been discarded.

A fourth process, not yet widely used, is called froth flotation which utilizes frothing agents to remove $TiO_2$ impurities. These froths rise to the surface and are removed to leave an improved brightness product.

The present invention is directed to a process for producing a usable pigment from the reject material from the above processes or a similar process which produces a low brightness, titanium dioxide-rich reject.

SUMMARY OF THE INVENTION

In the present invention a method for producing a low brightness, high yellow index clay pigment from a clay containing iron-stained titanium dioxide is described. The clay is dispersed in water to create a kaolin dispersion which is separated into an aqueous high brightness fraction and an aqueous lower brightness fraction. This lower brightness fraction contains substantially 4–12% by weight of dry clay $TiO_2$ and substantially between 0.5–2.5% by weight of dry clay $Fe_2O_3$. The lower brightness fraction is concentrated to form a kaolin suspension which contains kaolin particles and iron-stained $TiO_2$ particles. The kaolin suspension is washed to remove excess salts to form a kaolin pigment slurry.

In another embodiment of the present invention, a low brightness clay pigment is provided which comprises kaolin particles containing substantially between 5–12% by weight of dry clay $TiO_2$, substantially between 0.5–0.25% by weight of dry clay $Fe_2O_3$. This pigment has a TAPPI brightness substantially between 60 and 80.

It is accordingly one object of the present invention to provide a method for producing a $TiO_2$-rich pigment from the rejects of a mineral beneficiating process.

It is another object of the present invention to provide a method for producing a mineral pigment from a mineral flocculated by means of an anionic polymer.

It is a further object of the present invention to provide for a mineral pigment which has been recovered from the rejects of a sedimentation process.

It is a further object of the present invention to provide for a mineral pigment which has been recovered from the rejects of a magnetic separation process.

It is a further object of the present invention to provide for a mineral pigment which has been recovered from the rejects of a froth flotation process.

It is a further object of the present invention to provide for a mineral pigment which has been produced from a mineral flocculated by means of an anionic polymer.

It is yet another object of the present invention to provide a pigment which has a low brightness high yellow index for board coating applications to reduce mottling yet provide superior hiding power.

It is yet another object of the present invention to provide a pigment which may be utilized to adjust brightness and simultaneously improve printing qualities.

It is a further object of the present invention to provide for a paper product which incorporates a mineral pigment which has been recovered from the rejects of a beneficiating process.

It is a still further object of the present invention to provide for a paper product which incorporates a low brightness pigment.

According to the present invention, there is provided a method for producing pigments from reject kaolin which has been separated from the high brightness product flow stream. The present invention also provides for a novel pigment produced from the rejects of mineral beneficiating processes.

By way of the present method, there is further provided pigments which can be utilized in the production of a variety of paper and paper board products.

DETAILED DESCRIPTION

In the process of the present invention, useful pigments are produced from kaolin clay by first dispersing the clay in a convenient manner well known in the art and then separating the dispersion into a high brightness, low yellow index fraction and a low brightness high yellow index fraction. This separation may be done by the separation methods discussed earlier, such as selective sedimentation, selective flocculation (DFA), magnetic separation or froth flotation, either alone or in combination. Heretofore, only the higher brightness, lower yellow material was subjected to further processing to a final product and the lower brightness fractions were either reprocessed for further extraction of high brightness material or, if no more high brightness material could be extracted, discarded. It is a discovery of the present invention that these "rejects" can be made into a useful pigment.

After the dispersed clay has been separated into a high brightness (+85 TAPPI), low yellow index fraction, and a low brightness (<80 TAPPI) high yellow index fraction, the clay particles and iron-stained $TiO_2$ in the low brightness fraction are concentrated to produce a mineral suspension. This concentration step permits the efficient handling and further processing of the pigment.

Concentration may be achieved by filtration, frothing or sedimentation, but flocculation followed by hydro-separation with filtration is presently preferred. This produces a flocculent typically having a solids content of about 65 percent. If the DFA process is employed, it may be seen that separation of fractions and concentration of pigment is achieved simultaneously. If separation is achieved by magnetic separation, the "rejects" are already dispersed at low solids 1–3%) in the magnet flush water. If concentration is achieved by filtration, later dispersion may not be necessary. However, it is presently believed that flocculation of the pigment from the flush water would still be preferred. If separation is by selective sedimentation, the reject slurry may already be in a dispersed state at high enough solids for further processing. If not, it too may be flocculated or filtered. If the separation is achieved by froth flotation, the froth is substantially concentrated also, although further concentration may be desired.

After the $TiO_2$-rich pigment is concentrated, the pigment is thoroughly washed to remove excess salts accumulated in earlier processing. This washing ma be achieved by elutriation of the flocculent at low solids and then filtered, centrifuged or by other means known to the art, but it is most preferred to disperse the concentrate (if a polymer floccule), dilute the slurry, screen, re-flocculate and filter as more fully described later. The pigment can be further washed on the filters by using sprays or multiple filtration. It should be noted that it is good practice during the process to periodically screen or "degrit" the concentrate slurry while it is in the dispersed, and often more dilute, state.

After washing, the filter cake is dewatered. This may be achieved by redispersing the pigment, typically with an organic dispersant, and spray drying or drying the filter cake directly and milling. Alternatively, a portion of the dispersed pigment may be spray dried and blended back into the dispersion slurry to increase the solids content sufficiently for use as a slurried pigment.

By way of example, a more preferred process embodiment utilizing the rejects from the DFA process will be discussed in detail; however, it is understood that conventional modification of the method to utilize the rejects from magnetic separation, selective sedimentation, froth flotation or other processes would be within the scope of the present invention and that the rejects, separated by whatever method, are substantially similar.

This more preferred embodiment for preparing useful low brightness, high yellow index pigments from kaolin involves dispersing a crude kaolin clay in water using excess dispersants and degritting as required. Following high shear mixing, additional salts, preferably sodium chloride, are added with dilution and the dispersion is aged. The dispersion is further diluted and flocculated with an anionic, high molecular weight polymer to separate the kaolin dispersion into a high brightness and low brightness fraction. The low brightness floccule, rich in iron-stained $TiO_2$, is concentrated and removed by hydro-separation. For a more detailed discussion of the DFA separation process, see U.S. Pat. No. 3,857,781 to Maynard which is hereby incorporated by reference.

The floccule so produced, and heretofore termed "rejects", is redispersed at high shear agitation, adding a suitable dispersant, typically sodium hexametaphosphate. The solids content during this agitation preferably should be adjusted to about 30–50 percent by weight, typically about 40%.

Once the flocculated material has been redispersed, it is preferred that the solids content thereof is adjusted as necessary in order that the dispersion may be degritted by passing it through a screening process. At this point the solids content should be adjusted to about 25 to 50 wt. %, typically about 35%.

Following degritting, if elected, the mineral slurry is reflocculated and filtered to remove excess salts. Reflocculation is achieved by adjusting the solids content to between about 20 to about 30 wt. % and adjusting the pH of the slurry to between about 3.0 and 5.5, with pH 4 being preferred. In a preferred embodiment the pH was initially adjusted to below about 5.5 by the addition of a strong acid, e.g. sulfuric acid. The final pH adjustment was achieved by the addition of alum. After filtering, the filter cake is then either redispersed and spray dried or acid dried and physically sized, e.g. by air classification, according to the desired final product characteristics. The resulting pigments contain 5–12% by weight $TiO_2$ and 0.5–2.5% $Fe_2O_3$. More typically, the pigment contains 7–10% $TiO_2$ and 1–2% $Fe_2O_3$. Throughout, all Ti and Fe compounds present are reported as if 100% in the form of its respective oxide.

An alternative, through less preferred technique for removing excess salts from the TiO$_2$ rich floc involves elutriating or washing the flocs with water under low agitation conditions and then filtering and drying as described above. Many other techniques are well known in the industry to alternately disperse, flocculate and re-disperse to beneficiate kaolin slurries and these same techniques can be employed in practicing the present invention.

As discussed above, the present process may be utilized to recover pigments from the rejects of a beneficiation process that utilizes polymers as flocculating agents. Alternatively, the initial starting material may be a mineral, such as a crude clay, which includes titanium and/or iron compound impurities. In such a case, in order to obtain pigments according to the present invention the titanium and/or iron compounds must first be concentrated.

In order to concentrate the iron-stained titanium impurities the clay must be subjected to a beneficiation process which causes the titanium impurities to be removed and concentrated. The preferred procedure for this concentration of titanium impurities follows the general procedure set forth in U.S. Pat. No. 3,857,781. That is, the mineral, e.g. clay, is dispersed, treated with a salt and aged. After aging with the salt, the dispersion is treated with a polymer which effects sedimentation of the titanium impurities by forming titanium polymer flocs which subsequently settle out.

Preferred salts used for selective flocculation of the titanium impurities include sodium chloride, sodium sulfate, sodium carbonate, potassium chloride, sodium nitrate and ammonium chloride, with sodium chloride being more preferred. The amount of salt utilized to effectively treat clay mineral dispersions has been found to be between about 4-50 pounds per ton of dry clay, and more preferably about 12 pounds per ton of dry clay. The salt should be added to a 25-45 wt. % solids mineral dispersion, and more preferably to about a 40 wt. % solids mineral dispersion. The initial mineral dispersion may be produced by utilizing a suitable dispersion agent such as sodium hexametaphosphate and/or sodium metasilicate.

The salt treated clay should be aged for a period of from 5 to 24 hours under static conditions. Otherwise the salt treated dispersion may be aged for 1 to 5 hours under mild agitation. The latter aging process is more suitable for commercial production.

After aging, the dispersion should be adjusted to have a solids content between about 10 to 30 wt. %, and preferably 20 wt. %. During or immediately following dilution the polymer flocculation agent is added at about 0.01 to 0.3 pounds per ton of dry clay to form iron-stained titanium-polymer flocs which settle out, thus forming the titania-rich clay concentrate utilized to produce the pigments according to the present invention.

Preferred polymers utilized as flocculation agents include Nalco 635 and 675, a water soluble, strongly anionic, polyacrylamide polymer with a molecular weight in excess of one million, produced by Nalco Chemical Company, Chicago, Ill. and Betz 1200, 1210, 1220 and 1230, a water soluble, strongly anionic, organic copolymer of acrylamide having a molecular weight in excess of one million, available from Betz Laboratories, Inc., Trevose, Pa. Other suitable polymers employed comprise water soluble, strongly anionic products produced by the polymerization of acrylamides or copolymers of acrylamide and other monomers polymerizable therewith such as acrylic acid, methacrylic acid, etc.

It is important to distinguish the above titanium concentration process from the beneficiation process of U.S. Pat. No. 3,875,781. In this regard there are a number of considerations that effect the properties of the final product of U.S. Pat. No. 3,875,781 as discussed therein. U.S. Pat. No. 3,875,781 is primarily interested with the beneficiated clay, and according selects process parameters to insure desired properties of the beneficiated clay.

In contrast to U.S. Pat. No. 3,875,781, the present process is utilized to obtain a concentrate of titanium impurities for subsequent production of a pigment having a high concentration of titanium compounds. The properties of the "beneficiated" mineral or clay in the above process may be of little concern, since it may be subjected to other treatment processes. Accordingly, the process parameters may be selected to optimize or control the amount of titanium concentrated.

The following example is illustrative of a preferred embodiment used for producing a clay pigment according to the present invention which is not to be considered as limited thereto. In this example and throughout percentages are by weight unless otherwise indicated.

EXAMPLE

A 55-gallon drum of polymer flocculated anatase reject material from a DFA hydroseparator underflow stream was used. The contents of the drum were agitated with a Lightnin-type mixer equipped with a marine-style impeller. The agitated contents were sampled and found to have 47.25 wt. % solids. The analytical technique utilized for determining the percent solids by specific gravity had to be modified to account for the density changes caused by flocculating the slurry with polymers. For this purpose, based on the previous processing of the clay, a correction factor of +0.3 g/100 cc has used. Thus the 653 pounds of slurry contained 308 pounds of bone dry, iron-stained TiO$_2$ rich clay. The slurry pH was measured at 10.4.

The contents of the drum were transferred to a 30-inch diameter tank placed under a 25 H. P. Cowles dissolver installed with an 18-inch diameter dissolver blade. In order to break up the flocs, and to disperse the clay, one pound per ton B. D. clay (lbs/TC) of sodium hexametaphosphate (Calgon) was added and the slurry was agitated for 5 minutes with the Cowles mixer. The temperature of the slurry was observed to rise from 24° to 27° C. The Cowles dissolver was turning at 750 RPM, yielding a tip speed (on the 18-inch impeller blade) of 3534.3 feet per minute.

The slurry was next transferred from the tank under the mixer through a screener and into a storage tank. In order to pass the slurry through the screener, it had to be diluted to about 40 wt. % solids. The necessary dilution was conducted by adding water to the slurry in the tank under the mixer. The slurry was pumped directly to a 48-inch diameter Midwestern vibrating screener, equipped with a 325 mesh screen. The material that passed through the screen was caught in a catch-bucket on the inlet to a centrifugal pump, which moved the material to a potbellied tank. A total of 77.7 gal. slurry was recovered. Analysis revealed a solids content of 36.27 wt. %, for a total of 302.8 pounds of B. D. clay, and a yield of 98.31%. The purpose of the screening was to degrit the slurry. About one liter of grit was found to have remained on the screen at the end of the transfer.

The exact solids content of the dispersed slurry was then used to dilute the slurry to solids range of 22.5 to 23.5 wt. %. A solids content of 23.33 wt. % was actually achieved. This slurry was then flocculated by adding sulfuric acid ($H_2SO_4$) until a pH of 5.03 was achieved and then adding alum to a pH of 3.9. This resulted in the addition of 7.5 lbs acid/ton B. D. clay, and 6.0 lbs alum/ton clay (dry basis). A small portion of this slurry was filtered on a buchner funnel filter to provide the "heel" required for the full discharge on the pilot rotary vacuum filter, a 1-foot diameter by 1-foot wide pilot rotary vacuum filter. Although it took a significant amount of time to accomplish the filtration, no problems were encountered. The filtration parameters are given in Table I below.

TABLE I

| Filtration area | 3.14 ft$^2$ |
| --- | --- |
| Drum speed | 1.7 RPM |
| Cloth, porosity | 4-6 cfm |
| Vacuum | 22-24 in Hg |
| Wet filter cake | 96 lbs/m |
| Cake solids | 60.13% |
| Dry clay | 57.7 lbs/hr |
| Filtration rate | 18.4 lbs dry clay/hr/ft$^2$ |
| Filtrate solids | 0.38% |

A total of 477 lbs. of filter cake was obtained. Moisture analysis revealed a solids content of 60.33%, for a total of 288 lbs. B. D. clay, and a yield of 95.1%.

The filter cake was placed in a small tank, under a small Cowles Dissolver and dispersed in two batches. To each batch was added 9.2 lbs./TC fresh as-received Colloid 21.1, and 4.1 lbs./TC soda ash to disperse the filtered cake. The slurry pH was 6.9 (target range was 6.8-7.2). In addition, sufficient water was added to reduce the solids content down to 52 wt. %, to facilitate screening. Tip speed on the small Cowles dissolver was maintained at about 3500 RPM. The slurry was screened again, through 325 mesh screen, and then spray dried.

A large spray dryer was used to dry the entire lot of material, as per standard procedure. Outlet temperature was held at 220° F. by varying the feed rate, and the inlet temperature was maintained at 1000° F. by varying the gas to the air heater. Product data is given in Table II below.

TABLE II

| Spray dried moisture | 0.6% |
| --- | --- |
| Brightness (TAPPI T-534) | 71.6 |
| Whiteness | 32.8 |
| Yellowness | 15.2 |
| +325 mesh grit | 0.002% |
| Chemical Analysis | |
| TiO$_2$ | 8.1% |
| Fe$_2$O$_3$ | 1.5% |
| Al$_2$O$_3$ | 36.5% |
| SiO$_2$ | 43.7% |
| Particle Size (Sedigraph) | |
| +10μ | 4.5% |
| +5μ | 16.0% |
| −2μ | 64.5% |
| −1μ | 55.0% |
| −0.5μ | 46.0% |
| −0.2μ | 25.5% |

The clay made by the above-described process may be utilized as a coating in applications wherein high brightness is not required. For example, it has been discovered that clay processed by the present invention is usable as a precoat for a paper or paperboard with low brightness base stock. The use of the low (60-80 TAPPI) brightness clay reduces the contrast between the coating and the base stock, thereby reducing the mottled appearance of the finished sheet. Furthermore, the iron-stained titanium dioxide present in the clay pigment due to the concentration effect of prior processing (5-12% by weight) gives hiding power superior to that attainable with clay alone.

Typically, if titanium dioxide were added to a standard coating clay, the brightness of the coating would increase and the mottling would be exaggerated due to the uneven coating distribution over the rough, unbleached fiber surface. To lessen this potential problem, a dye or colorant would have to be added to the coating. This procedure reduces the contrast between the coating and the base stock. The product of the present invention would be used without additional titanium dioxide and without dyes or colorants.

The product of the present invention has also been discovered to be particularly useful in woodfree paper grades. The use of greater amounts of calcium carbonate in coatings today for woodfree premium paper grades may result in the finished sheet exceeding the brightness limit for a specific grade. In mills were several grades of paper are produced, and various brightness levels are required, base sheet brightness cannot be varied in the pulp mill and be cost-effective. The coating formulation, therefore, must be the agent of change. Dyes and colorants can control the brightness and shade but the pigment of the present invention will not only control shade and color, it will act as a kaolin clay pigment, providing improved coated sheet properties such as paper gloss, and improved print quality, as clay yields better printed gloss than calcium carbonate.

Although the invention has been described with reference to particular means, materials and embodiments, from the foregoing description, one skilled in the art can ascertain the essential characteristics of the present invention and various changes and modification may be made to adapt the various uses and characteristics thereof without departing from the scope of the present invention as described in the claims that follow.

We claim:

1. A paper product which includes a low brightness, high yellow index kaolin pigment from a kaolin clay containing iron-stained TiO$_2$, the pigment produced by the method comprising:

dispersing the kaolin clay in water to form a kaolin dispersion;

separating the kaolin dispersion into an aqueous high brightness fraction and an aqueous lower brightness fraction, the lower brightness fraction having a TiO$_2$ content substantially between 5-12% by weight dry clay and an Fe$_2$O$_3$ content substantially between 0.5-2.5% by weight dry clay;

concentrating the lower brightness fraction to form a kaolin suspension containing kaolin particles and iron-stained TiO$_2$ particles;

dispersing the concentrated kaolin suspension with a dispersion agent;

diluting the dispersed kaolin suspension;

flocculating the diluted suspension and filtering the flocculated suspension to form a filter cake thereby removing excess salts.

2. An improved coated paper or paperboard comprising:

a paper or paperboard base stock having a sufficiently low brightness to induce a mottled appearance if coated directly with a high brightness finish coating;

a high opacity, low brightness precoating on the base stock, the precoating containing an uncalcined low brightness kaolin pigment having a $TiO_2$ content of 5-12% by weight of dry clay and an $Fe_2O_3$ content of 0.5-2.5% by weight of dry clay, the kaolin pigment having a TAPPI brightness substantially between 60-80; and said high brightness finish coating thereafter placed upon the precoating to produce a finished coated paper or paperboard sheet having a reduced mottled appearance.

3. A coated woodfree grade paper having a reduced brightness, comprising;

a woodfree grade base sheet having a base brightness; and a paper coating placed upon the base sheet, the coating including calcium carbonate particles having a high brightness and a selected amount of an uncalcined, low brightness kaolin pigment having a $TiO_2$ content of 5-12% by weight of dry clay and an $Fe_2O_3$ content of 0.5-2.5% by weight of dry clay, the uncalcined kaolin pigment having a TAPPI brightness substantially between 60-80, the amount of uncalcined low brightness kaolin pigment selected to variably reduce the brightness of the calcium carbonate particles resulting in a coated woodfree grade paper having a selected brightness greater than the base brightness and less than the high brightness.

* * * * *